Nov. 21, 1950  L. S. GIRARD  2,530,518
HOOK FASTENER
Filed May 17, 1948
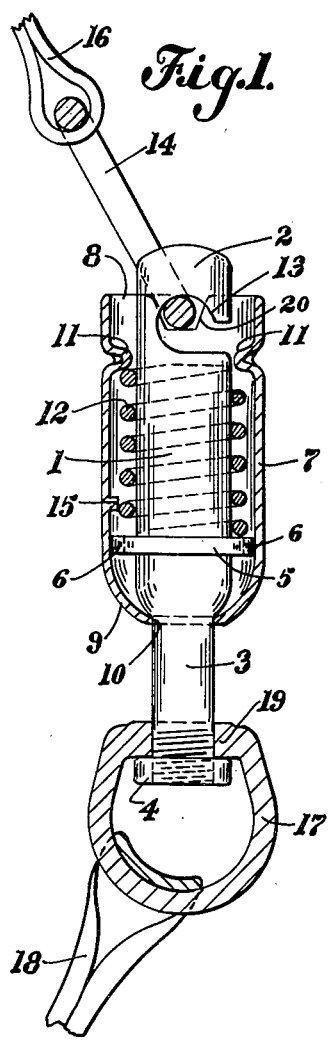
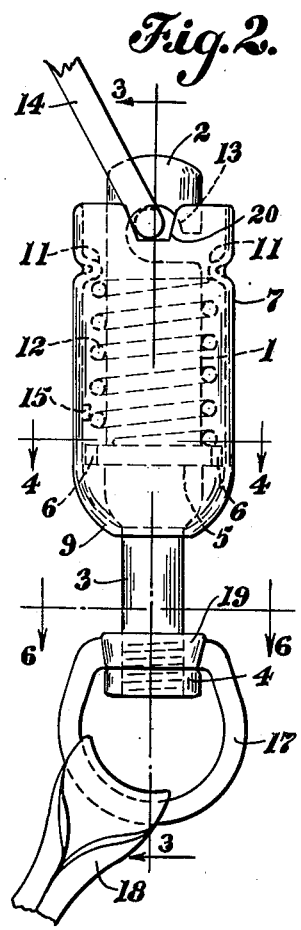
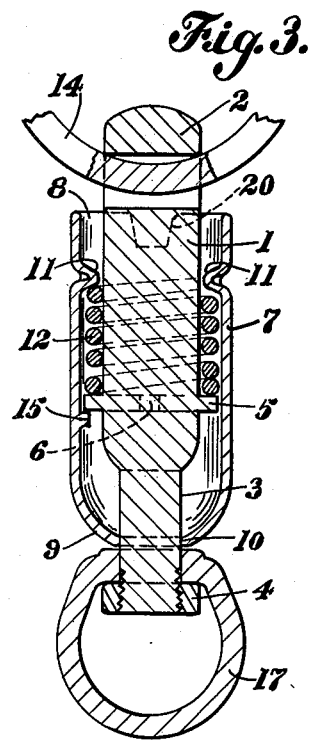
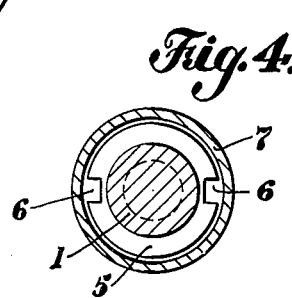
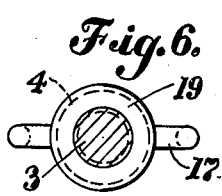
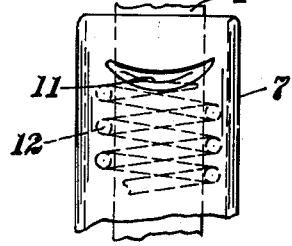
INVENTOR.
BY Lloyd Stephen Girard
Heard Smith & Tennant
Attorneys.

Patented Nov. 21, 1950

2,530,518

UNITED STATES PATENT OFFICE 2,530,518

HOOK FASTENER

Lloyd Stephen Girard, Quincy, Mass.

Application May 17, 1948, Serial No. 27,378

1 Claim. (Cl. 24—239)

This invention relates to a hook fastener of the type comprising a hook member having a hook at one end and means at the other end for attachment to a cord or a leash and the like, and a tubular guard member surrounding the body of the hook member and movable relative thereto between an operative hook-closing position in which it covers and closes the hook of the hook member, and an inoperative position in which the hook is exposed for being connected to or disconnected from a ring or other similar object.

One object of the invention is to provide a hook fastener of this type which is relatively simple in construction and which can be easily manipulated to place the hook in an open or a covered position.

While a hook fastener embodying my invention is capable of general use wherever devices of this type are used, yet it has special advantages when used as the hook fastener of a dog leash, because of the ease with which the fastener can be connected to or disconnected from the ring of the dog collar.

A further object of the invention is to provide a hook fastener of this type which eliminates the possibility of the hook becoming accidently disconnected from the ring or other article to which it is secured. This is of special advantage in connection with a dog leash.

In order to give an understanding of the invention, I have illustrated in the drawings a selected embodiment thereof, which will now be described after which the novel features will be pointed out in the appended claims.

In the drawings,

Fig. 1 is a view of the hook fastener with the guard member and spring shown in section and illustrating the guard member in hook-closing position;

Fig. 2 is a side view thereof;

Fig. 3 is a longitudinal sectional view of the hook fastener showing the hook in its open position;

Fig. 4 is a section on the line 4—4, Fig. 2; and

Fig. 5 is a fragmentary view of the device as seen from the right in Fig. 2.

Fig. 6 is a section on the line 6—6 of Fig. 2.

My improved device comprises a hook member presenting a body portion 1 and an inner end portion 3 of reduced diameter. The body portion 1 has a hook 2 at one end and the end portion 3 of reduced diameter is provided at its end with a head 4. The body portion 1 of the hook member is provided with a peripheral flange 5 which is spaced some distance from the hook 2 and which is formed in its periphery with one or more notches 6, two such notches being shown herein which are situated diametrically opposite each other.

Surrounding the body portion 1 of the hook member is a tubular guard member 7 which is open at one end as shown at 8, the other end 9 being tapered inwardly and being provided with an opening 10 through which the reduced portion 3 of the hook member extends. The guard member 7 has an interior diameter which is larger than the diameter of the body portion 1 and which corresponds in diameter to that of the peripheral or circumferential flange 5. The guard member 7 is provided near its open end with one or more inwardly extending shoulders 11, two such shoulders being herein illustrated. These shoulders may be provided for in various ways and as shown in the drawings, each shoulder is formed by indenting the material of the side wall of the guard member 7.

There is thus provided an annular space between the guard member 7 and the body portion 1 of the hook member and between the flange 5 on the body member and the interior shoulders 11. Situated in this annular space is a spring 12 which encircles the body portion 1 of the hook member and bears at its ends against the flange 5 and the shoulders 11. Said spring acts normally against the shoulders 11 and flange 5 to hold the guard member and hook member in the relative positions shown in Figs. 1 and 2 in which the beak 13 of the hook is located within the open end 8 of the guard member, so that when in this position the guard member acts to close the hook. The in-turned end portion 9 of the guard 7 cooperates with the shoulder formed between the body of the hook member and the reduced portion 3 to limit the spring impelled relative movement of the hook member and the guard member, said spring normally holding the guard member in position to close the hook as shown in Fig. 1.

The hook can be opened or exposed by moving the guard member and the hook relatively in an axial direction, that is by moving the guard member downwardly in Fig. 1 relative to the hook member against the action of the spring 12, or by moving the hook member upwardly relative to the guard member, also against the action of the spring 12, thereby to project the hook beyond the open end of the guard member so that it can be hooked into a ring 14 or any other similar element.

Means are provided for locking the hook in its open position. Such means comprise a locking projection 15 which projects inwardly from the wall of the guard member 7 and which is of a size to pass through either of the notches 6. When the guard member and hook member are properly positioned so that the projection 15 is lined up with one of the notches 6, then the relative movement of the guard member and hook member to open the hook moves the projection 15 through a notch 6 and as soon as said projection has passed through the notch 6, then a turning movement of either the guard member or the hook member will disaline the projection 15 and the notch, thus carrying said projection 15 underneath the flange 5. The engagement of the projection with the flange will lock the hook in its projected or open position as shown in Fig. 3.

If the device is used as a dog leash, the ring or element 14 may be the ring of the dog collar, a portion of which is shown at 16. The projecting portion 3 of the hook member has associated with it a ring or loop 17 to which the dog leash 18 may be secured. This ring 17 may be fastened to the projecting portion 3 in any suitable way, but as herein shown, said ring is provided with an annular hub portion 19 which encircles the stem and which is retained thereon by the head 4.

The open end of the guard member 7 is provided with two oppositely disposed notches 20 in which the ring 14 is received when the hook is in its closed position.

Assuming that the hook fastener is attached to the ring 14 of the dog collar and it is desired to release the dog, the person in charge will hold the guard member 17 with the thumb and fingers of one hand and will pull upwardly on the hook member through the medium of the ring 14 with the other hand, thereby drawing the hook out sufficiently to release it from the ring 14. During this operation the projection 15 passes through the notch 6 as above described and by turning either the guard member or the hook member slightly, the projection 15 is carried beneath the flange 5 thus locking the hook in its open position.

To attach the hook fastener to the ring 14 again involves simply hooking the hook 2 into the ring and then turning the hook or the guard member slightly to bring the projection 15 and the notch 6 into alinement. As soon as this is done the spring 12 automatically shifts the hook member and guard member relative to each other into the hook-closing position shown in Figs. 1 and 2.

The notches 20 in the end of the guard member and the projection 15 have such a relation that when the ring 14 is engaged by the hook and is occupying the notches 20 of the guard member 1, the projection 15 will be alined with one of the notches 6 so that the hook can be exposed by simply moving the guard member axially relative to the hook member and without the necessity of having to feel for the notch 6.

An advantage of this type of hook fastener is that the leash is directly connected with the dog collar through the hook member 1, and when the device is being used, none of the strain on the leash is transmitted to either the guard member 7 or the spring 12.

I claim:

A hook fastener comprising an elongated hook member presenting a body portion of uniform diameter having a hook at its outer end and an inner end portion of reduced diameter, there being a shoulder on the hook member where the end portion of reduced diameter merges with the body portion, said body portion having an exterior circumferential flange spaced from the hook and provided with a notch, an open ended tubular guard member surrounding the hook member, said guard member having an interior diameter larger than the diameter of the body portion of the hook member and corresponding with the diameter of the circumferential flange, and also having an interior shoulder adjacent its outer end, whereby an annular space is provided between the body portion of the hook member and said guard member and between said circumferential flange and said internal shoulder of the guard member, a spring surrounding the body portion of the hook member and occupying said annular space, the ends of said spring bearing against said circumferential flange and said interior shoulder and normally urging the hook member and the guard member into relative positions in which the hook is covered by the open end of the guard member, said guard member having an internal projection located on the hook side of the flange when the guard member is in hook-closing position, said guard member and hook member being movable relative to each other in an axial direction against the action of the spring to expose the hook beyond the open end of the guard member, said projection passing through said notch during such relative movement, relative turning movement of the guard member and hook member positioning the projection beneath the flange and thus locking the hook in open position.

LLOYD STEPHEN GIRARD.

REFERENCES CITED

The following references are of record in the file of this patent:

UNITED STATES PATENTS

| Number | Name | Date |
|---|---|---|
| 302,509 | Mauthner | July 22, 1884 |
| 967,486 | Avery | Aug. 16, 1910 |
| 1,051,428 | McLeran | Jan. 28, 1913 |
| 1,399,207 | Goozey | Dec. 6, 1921 |
| 1,442,096 | Robinson | Jan. 16, 1923 |
| 1,583,326 | Waller | May 4, 1926 |

FOREIGN PATENTS

| Number | Country | Date |
|---|---|---|
| 57,600 | Denmark | May 14, 1940 |
| 448,050 | France | Nov. 15, 1912 |